United States Patent [19]
Opittek et al.

[11] 3,979,555
[45] Sept. 7, 1976

[54] HISTOGRAM EQUALIZATION SYSTEM FOR DISPLAY IMPROVEMENT

[75] Inventors: Eugene W. Opittek, Santa Ana; David J. Ketcham, Lakewood; Edward J. Dragavon, Los Angeles, all of Calif.

[73] Assignee: Hughes Aircraft Company, Culver City, Calif.

[22] Filed: May 27, 1975

[21] Appl. No.: 582,478

[52] U.S. Cl............................. 178/6.8; 340/172.5; 343/5 DP
[51] Int. Cl.² ........................................ H04N 3/00
[58] Field of Search................. 178/6, 6.8, DIG. 34, 178/DIG. 21, DIG. 22; 340/324 A, 172.5; 343/5 DP; 38/37

[56] References Cited
UNITED STATES PATENTS

| | | | |
|---|---|---|---|
| 3,728,481 | 4/1973 | Froehlich..................... | 178/DIG. 34 |
| 3,829,841 | 8/1974 | Steinberg....................... | 340/172.5 |
| 3,903,357 | 9/1975 | Woolfson......................... | 178/6.8 |
| 3,919,707 | 11/1975 | Evans............................. | 343/5 DP |

*Primary Examiner*—Robert L. Griffin
*Assistant Examiner*—Michael A. Masinick
*Attorney, Agent, or Firm*—Walter J. Adam; W. H. MacAllister

[57] ABSTRACT

A histogram equalization system that adaptively redistributes the intensity coding of the video in order to provide an equal number of elements at all display intensity levels. The actual amplitude value of the input video as stored in an integrator, for example, is utilized to address a random access memory which originally is loaded with all zeros. The memory is organized such that there are as many addressable words as there are possible video intensity values carried in the integrator thereby building up a histogram within the memory. Upon completion of the histogram, a constant equal to the number of picture elements corresponding to the data used to form the histogram divided by the number of values to which it is desired to truncate, is utilized in a comparator as the histogram memory is sequentially read out and accumulated to determine the truncation points. A latching circuit is filled with the truncation point values and these points are used in a truncation logic circuit responding to the input video signal to reduce the number of video bits. The truncated signal increases the sensitivity to localized signal variations of a scene so as to increase the detail of the gray scale region requiring additional intensity codes.

10 Claims, 7 Drawing Figures

HISTOGRAM EQUALIZATION SYSTEM FOR DISPLAY IMPROVEMENT

The invention herein described was made in the course of or under a Contract or Subcontract thereunder with the United States Department of the Air Force.

BACKGROUND OF THE INVENTION

1. Field of the Invention

This invention relates to display systems and particularly to an improved histogram equalization system operable in response to video signals to develop truncated video signals having the property of providing an image with enhanced details.

2. Background of the Invention

Histogram equalization is a unique image contrast enhancement technique and historically has been applied to an entire picture frame in nonreal time computer software mechanizations. In histogram equalization the intensity coding of the video is redistributed by the regeneration of a digital video truncation matrix which when utilized to control the digitized video results in an equal number of elements at each display intensity level. In real time systems such as radar systems, laser systems, and infrared systems, truncation of the input video is conventionally performed either by linear truncation which involves utilizing a selected number of most significant bits or by logarithmic truncation generally utilizing logarithmic values stored in a read only memory. These types of trunction systems provide some contrast enhancement in the display picture but have the disadvantage of not being adaptable variations of the intensity level of the scene. It would be a substantial advantage in the art to provide a histogram equalization system operable in real time in response to video data that with a simplified mechanization adapts itself to scene variations to improve the picture detail and contrast properties.

OBJECTS AND SUMMARY OF THE INVENTION

It is thus an object of this invention to provide a system responsive to video data signals to provide truncated video signals having improved image detail and enhanced contrast.

It is another object of this invention to provide an improved and simplified real time histogram equalization system that by the generation of a digital video truncation matrix results in equal number of picture elements at each display intensity level.

It is another object of this invention to provide an improved histogram equalization system operable in a radar, laser or infrared receiving system which provides truncated video adapted to scene contrast variations.

It is a further object of this invention to provide an improved histogram equalization mechanization operable in a real time rader system to provide truncated improved video at the output of the azimuth integrator.

Briefly the histogram equalization system in accordance with the invention is performed with a suitable storage unit such as a digital video integrator with the actual video amplitude stored therein utilized to address a random access memory originally loaded with all zeros. The memory is organized such that there are as many addressable words as there are possible video intensity values carried in the integrator. During each addressing cycle a one representing the occurrence of a gray level amplitude value is added to the contents of the stored word thereby building up the histogram within the memory. Upon completion of the histogram, the memory is read out in order from an address equivalent to the lowest intensity value to the highest with the word value accumulated for a portion of the memory locations or addresses equal to the total number of picture elements in the portion of the scene utilized to form the histogram divided by the number of values to which it is desired to truncate. The word values for each portion of the memory after accumulation are latch numbers that represent the value of the truncation points and are sequentially stored in a latching circuit. The video integrator is then again read out to a truncation logic circuit that compares each video signal with the truncation point stored in the latching circuit and provides truncated video with a reduced number of video bits. The redistributed intensity levels of the truncated output video have an equal number of picture elements at all intensity levels and an increase in detail in the region of high occurrence of picture elements.

DESCRIPTION OF THE PREFERRED EMBODIMENT

Figure 1:
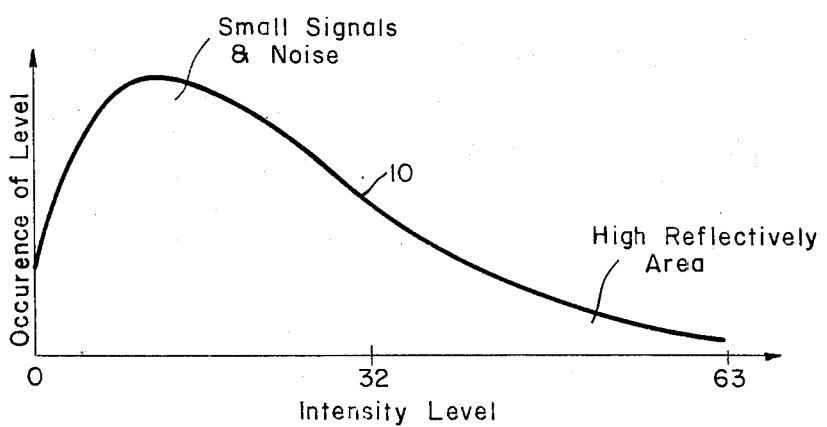
FIG. 1 is a schematic graph of the image histogram for an air to air radar return of an area in space showing the occurrence of intensity levels as a function of the gray scale intensity levels.
Figure 2:
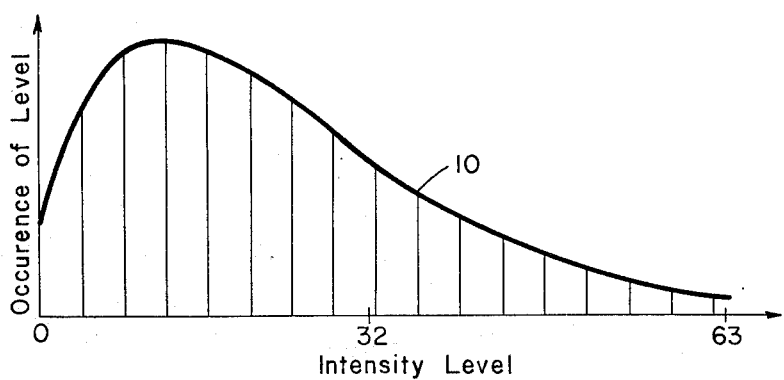
FIG. 2 is a schematic graph showing the histogram of the same radar returns as in FIG. 1 having equal intensity level slicing and showing the occurrence of intensity levels as a function of the gray scale intensity levels.
Figure 3:
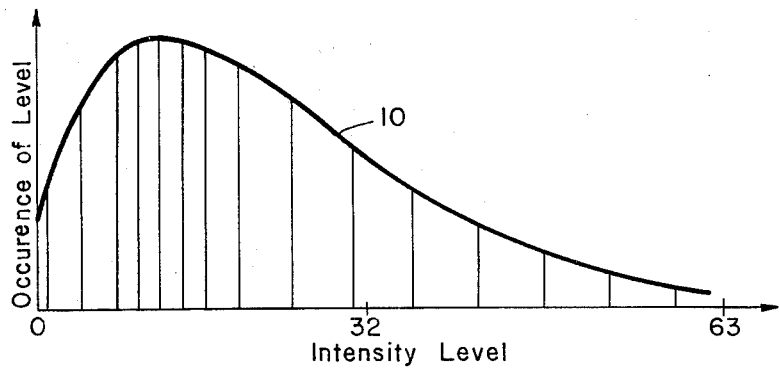
FIG. 3 is a schematic graph of a histogram for the same radar return in FIG. 1 showing the occurrence of the picture elements as a function of gray scale intensity levels for equal area slicing in accordance with the principles of the invention.
Figure 4:
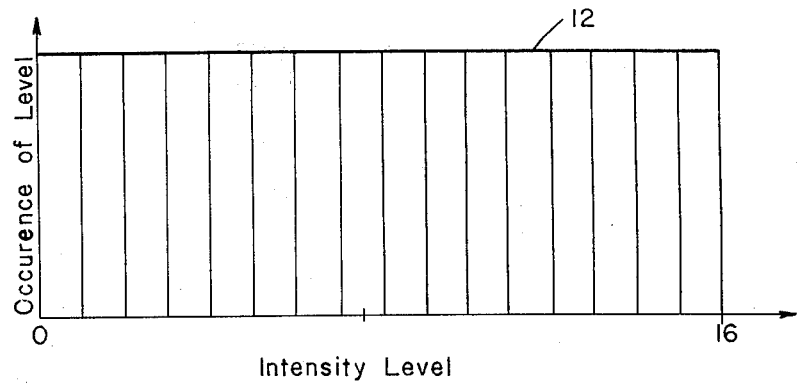
FIG. 4 is a schematic graph of a histogram for the same radar return as in FIG. 1 showing the occurrence of the intensity levels versus gray scale intensity level representing a histogram equalized image.

Referring first to FIG. 1, a curve 10 represents the histogram (frequency of occurrence diagram) formed by accumulating and tabulating the occurrences of each picture element represented by an input amplitude signal at each gray scale level which in the illustrated system is equal to 1024 quantized levels. However, for ease of illustration the histogram 10 is shown with 64 intensity levels and 16 levels for the truncated video. It is to be noted that occurrence of the picture elements, the total number at all levels being equal to the number of input video signals for forming a display frame, is greatest at the left end of the histogram 10 for the example of an air to air radar return. The histogram on the left may represent small signals and noise and on the right represents a high reflectively or large amplitude signal return area. This distribution indicates that a picture thereof is generally dark with few areas in the mid gray range and in the very light areas. For an air to air energy return, it is desirous to obtain further detail in the region of the small signals combined with the noise. Thus, the distribution of gray scale information in the example primarily lies at the left side end of the light/dark intensity scale. If the image is displayed on a cathode ray tube which generates 16 shades of gray, for example, the result is equivalent to slicing the gray scale axis of the histogram into 16 equally spaced levels as shown by the curve 10 in FIG. 2. Because it has been found that the amount of information is related to the level of occurrences of each gray scale, each intensity level in the displayed image is not utilized to carry the same amount of information. If the picture intensities are distributed as shown in FIG. 1 it would be advantageous to use more display gray scale levels where there are more occurrences of gray scale information in the image and fewer gray scale levels where there is less data. It is to be noted that this nonuniform distribution of gray scale levels can be computed by finding the total area under the histogram 10 and dividing this area into a selected number of slices such as 16 slices having equal areas as shown in FIG. 3. The intensity level boundaries for each slice then define the range of original intensity levels that will be assigned a new gray scale level for the displayed image. After the assignment of the gray scale levels a histogram of the resulting displayed image has a flat or equal distribution of gray scale levels as shown by a curve 12 of FIG. 4 which represents a histogram of a histogram equalized image. By developing displays with this technique, the contrast and hence the detail in the areas of the image having greater occurrences such as the darker portion of the histogram 10 of FIG. 1, are enhanced, and the areas of the image having lesser occurrences such as the light areas of the histogram 10 have not been enhanced since these brightness levels do not show a high level of occurrence in the histogram. It is to be noted the area of the histogram having low occurrence represents a part of the image that will have half as many gray scale levels in a processed picture than in the original. It has been found that an airborne target, for example, at long range provides a high level of occurrence in the small signal region so that the detail of the picture including a target is substantially enhanced. For other types of images such as for example, a tank on the ground in grass being scanned by a television format from the air, an image histogram may provide a greater level of occurrences in the grass area and a lesser level of occurrences in the tread area. For this air to ground target, it is desirous that the lighter area be more finely quantized, which is performed by a system in accordance with the principles of the invention. For other types of images, the histogram may provide amplitude peaks at any portion of the gray scale. The system in accordance with the invention is adaptive to all configurations of the histogram curve to increase the number of gray scale levels in region of most occurrences of the gray scale information. It has been found that improved picture quality is provided when greater detail of an image is provided in the region of high occurrence of the brightness levels. Experimental results have shown that the details and contrast of targets on terrain, for example, are substantially increased in a system utilizing the histogram equalization concept in accordance with the invention.

Figure 5:
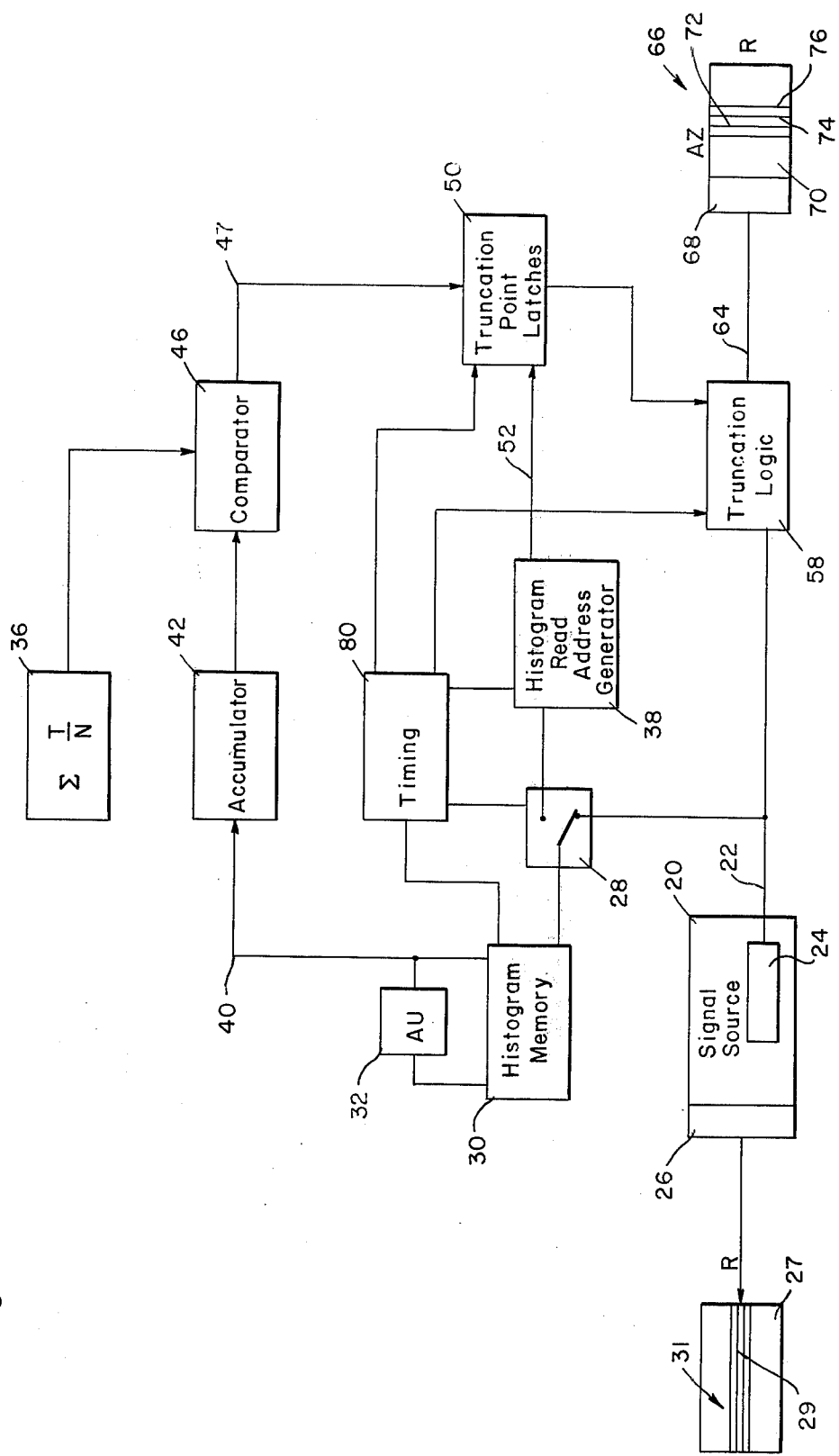
FIG. 5 is a schematic block diagram of a histogram equalization system in accordance with the invention.

Referring now to FIG. 5 which is a block diagram of the histogram equalization system in accordance with the invention, the quantized video may be received from a signal source 20 on a lead 22 and from a storage unit such as a shift register 24 within the signal source 20. The shift register 24 may be any suitable storage unit such as an integrator providing summing of range increments or bins in the azimuth dimension. In the illustrated system an antenna element 26 may receive data from a scene such as a portion 27 of space or ground terrain over a range R and along a azimuth dimension AZ. The shift register 24 has the capacity to store a number of amplitude video signals equal in number to the number of picture elements in a range sweep of data represented by a line 29 at the scene 27. When the register 24 is an integrator, the stored number of video signals includes some information from a plurality of range sweeps 31. The video signals which are digital and represent signal amplitude are applied from the lead 22, which is a composite lead, through a switch 28 to a histogram memory 30 during each addressing cycle thereof. The actual video value or amplitude value is utilized to address the memory 30 which prior to the formation of each histogram, has been reset to zeros at each address. The memory 30 is reset from a read address generator 38 with the switch 28 in the opposite position from that shown, while the address generator 38 sequentially develops all addresses of the memory. The memory 30 is organized such that there are as many addressable words as there are possible video intensity values stored in the shift register or integrator 24. Thus if the video has a value formed by words of ten bits, there are 1024 addressable word cells in the memory and upon each addressing cycle, a 1 is added to the stored word by an arithmetic unit (AU) 32. The histogram memory 30 may be any suitable type of addressable memory such as a core memory or other type of magnetic memory, such as a dynamic operating memory utilizing integrated circuits as are well known in the art or such as any suitable type of addressable memory. A constant source 36 provides a constant, T/N equal to the total number of picture elements, T divided by the number of values N to which is desired to truncate (shorten) such as 8 values for a 3 bit truncated video. If for example there are 512 picture picture elements, and N = 8, the constant which represents the number or occurrence of picture elements at each truncation point or between adjacent truncation points, is equal to 64.

The next step after the histogram is formed in the histogram memory 30, is to readout the histogram memory in order from an address equivalent to the lowest intensity value or decimal 0 to the highest intensity value of decimal 1023. The switch 28 is set to the opposite position shown andn the histogram read address generator 38 is activated to and addresses to the histogram memory from the lowest or a 10 bit binary number equal to the decimal number 0 to the largest or a 10 bit binary number equal to the decimal number 1023. The histogram word values stored in the memory 30 which are equal to the number of occurrences of that gray level of a scene are applied through a lead 40 to an accumulator 42 until the sum equals T/N or 64. Upon the occurrence of this condition, a comparator 46 responds to activate a gate in a truncation point latches circuit 50, which gate passes the read address from the generator 38 on a lead 52 to the latch circuit 50 where that value is stored. In one arrangement in accordance with the invention, the accumulator 42 is then reset and the stored values are again read from the memory 30 until the comparator responds to gate the address from the generator 30 into a selected latch in the latch circuit 50. When the memory is completely read out, the latch numbers stored in the latch circuit 50 represent the amplitude values of the input video signals for the truncation points of which there are 8 points in the 3-bit truncated video system. It is to be noted that the histogram address from the generator 38 represents the amplitude of the input video signals from the source 20.

The 10-bit video signals are then again read from the signal source 20 into a truncation logic unit 58 also receiving the latch numbers from the latch circuit 50 through a composite lead 60 which consists of a comparator and upon a proper comparison applies a 3-bit signal on a composite lead 64 to a utilization unit 66 which may include suitable input circuitry such as a scan converter 68 and a display unit 70. Signals are then applied from the scan converter 68 to the display unit 70 which for example may display azimuth lines in one dimension with range being the other dimension of the display. It is to be understood that the invention is not limited to any particular type of display but is illustrated as displaying a TV type display forming a raster or frame of a plurality of lines such as 72, 74 and 76. A suitable timing unit 80 may be provided to apply timing signals to the memory 30, the read address generator 38, the switch 28, the truncation logic unit 58 and the truncation point latch circuit 50 as well as for syncronizing the display unit 66.

Figure 6:
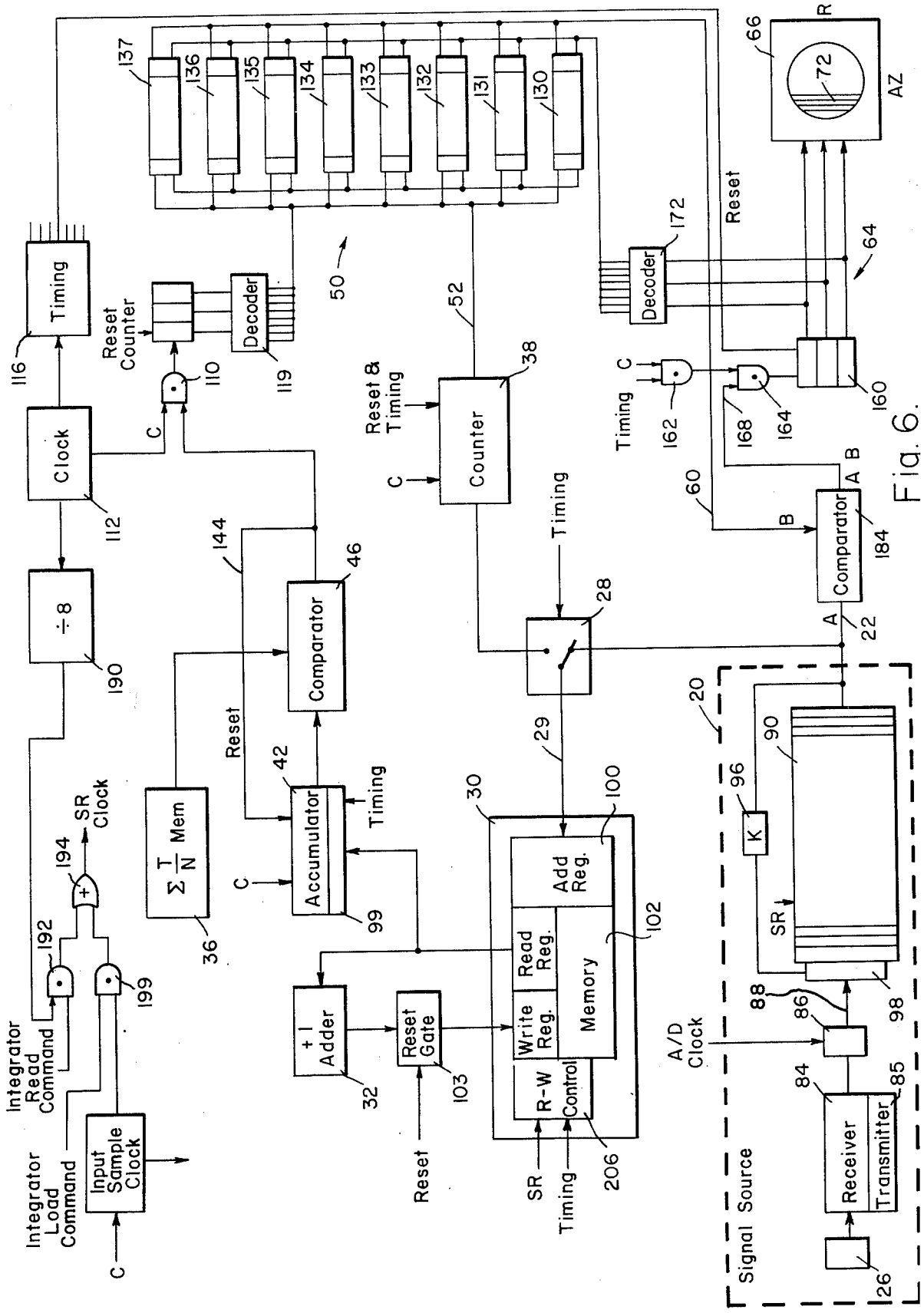
FIG. 6 is a schematic block diagram showing the histogram equalization system of the invention in further detail.

Referring now to FIG. 6 which shows further details of the illustrated histogram equalization system in accordance with the principles of the invention, the antenna element 26 of the signal source 20 may be a suitable transmitting and receiving element such as an antenna or a laser optical system or a receiving element such as an infrared detector unit, and which applies received signals to a receiver 84 for each range incrementor bin of each range sweep. The receiver 84 may be an appropriate receiver for the type of system utilized, and applies the analog video data signals to an A/D converter 86 for developing video digital amplitude signals. The A/D converter 86 applies the digital video signals through a lead 88 to a digital video integrator 90 which may include ten serial arranged shift registers for the 10-bit video received from the A/D converter 86, with a video signal during each range increment or bin of the entire range sweep being recirculated from the output line 22 through a suitable gain constant K multiplier 96 to be summed with the input video for that range bin in a summing unit 98 and to be again transferred serially through the integrator 90 during each subsequent range bin period over the entire range sweep. In the illustrated system, this azimuth summing is performed ten times for ten range sweeps before the video signal is formed that will be utilized for the histogram formation. It is to be noted that the principles of the invention are not to be limited to a system utilizing an integrator but that any suitable shift or storage register may be utilized for storing a sweep of data either of summed values or original received values with this data being utilized to form the histogram that will provide equalization values for only one sweep of data or for a plurality of sweeps of data. At a selected time, the 10-bit video amplitude data in the integrator 90 is read through the switch 28 with the digital magnitude or amplitude value addressing the histogram memory 30 which is illustrated as a magnetic storage memory, but it is to be understood may be any suitable type of memory such as a solid state memory. The address on the composite lead 29 is applied to an address register 100 which addresses words in a storage memory 102 having memory storage words addressable from 0 to 1023 in the illustrated system. Prior to this address sequence, the contents of the 1024 words in the memory 102 have been reset to 0. The resetting may be performed in the illustrated system by addressing each cell of the memory from the counter 38 with the switch 28 in the opposite position from that shown and a reset gate 103 switched to an open position as that the write cycle is not performed, it being understood that this illustrated reset arrangement is only applicable to a type of memory having a read cycle that sets all storage elements to the zero condition (e.g. half cycle magnetic core).

As each word cell is addressed in the memory 102, the contents thereof are read into the read register 104 after passing through suitable sense amplifiers (not shown) and applied through the lead 40 to the +1 adder 32 which in turn applies the word into a write register 108 for storage in the same cell position in the memory 102. After all of the video signals in the integrator 90 which may be any number such as 1024 corresponding to the number of amplitude levels of the input video have been read out of the integrator 90 and utilized to form the histogram in the histogram memory 30, the timing energizes a gate 99 of the counter 38 and changes the position of the switch 28 opposite from that shown. The frequency of occurrence content of each word cell starting from the lowest address are then read in response to the address of the counter 38 and applied to the accumulator 42. This addressing and accumulation continues until the comparator 46 detects a value of 64, in the illustrated arrangement, and applies a comparison signal through the lead 47 to an AND gate 110 also receiving a clock pulse (c) from a clock source 112. The clock source applies clock pulses to a suitable timing unit 116 which in turn applies reset pulses to a 3 bit counter 118 at the beginning of each readout from the histogram memory 30. The counter 118 during each readout period increases its count by one, which count is applied through a decode unit 119 to a composite lead 122, which for each truncation point energizes a gate at the input of one of the latch storage registers 130 to 137 for storing the truncation points or amplitude values in the unit 50. The gates such as a gate 140 for the latch register 130 responds to the signal on the lead 122 to apply the address on the lead 52 to the register for storage therein. The eight registers 130 to 137 are designated 000 to 111 to indicate the corresponding truncated video value that will be developed at the system output.

At this point in the operation, the accumulator 42 is reset in response to a signal received from the comparator 46 through a lead 144, and in response to a continuing count of the counter 38 the stored contents of the words of the memory 102 are again accumulated during a new address interval until the comparator 46 again responds. The gate 110 in response to the value in the accumulator 46 being equal to 64 passes a clock pulse through the AND gate 110 so that the counter 118 applies a new count address to the decode unit 119 through the composite lead 122 to allow the contents of the counter 38 to be stored in the second latch register 131. This procedure is repeated eight times until all of the truncation points are stored in each of the latch registers 130 to 137. These stored truncation points may then be utilized in the truncator logic unit 58 to reduce the number of video bits provided by the signal source 20.

In the truncation logic unit 58, a counter 160 having three stages is then reset by a pulse from the timing unit 116 and in response to a clock pulse an AND gate 162 applies a signal to an AND gate 164. An inverted latch signal on a lead 168 and the signal from the gate 162 causes the AND gate 164 to apply a signal to a counter 160 which counts from 000 to 111, one count being performed in response to each clock pulse C. At each count, a decode unit 172 responds to the 3-bit value on the composite lead 64 to energize a different gate such as 176 at the output of the latch registers 130 to 137 which sequentially transfers the contents to the composite lead 60 and into a comparator 184, the truncation point being indicated as B. During the period of this stepping of the counter which requires eight clock periods the video from that range bin is available from the integrator 90 on the lead 22 designated as A and is applied to the comparator 184. When the magnitude of A is greater than B indicating the truncation point of that video signal, a latch signal is applied on the lead 168 to the AND gate 164 to prevent the application of clock pulses to the counter 160 and the contents thereof is the truncated video which is applied through the composite lead 64 to the display unit 66 receiving a properly synchronized timing pulse for gating that value therein. This operation is repeated for each digital video signal in the integrator 90 until all of the truncated video signals for each of the input video signals have been read out. In this arrangement the truncated values because of the operation of the integrator 90, are utilized for a number of sweeps of the scene such as over 10 sweeps to form a single range line such as 72. In other arrangements, the principles of the invention may be utilized to provide from a single histogram, truncation values for any number of lines, for an entire raster, or for any selected area of the display scene all within the scope of the invention. The comparators 46 and 184 may be any suitable circuit such as Texas Instrument circuit types Ser. No. 54L85, Ser. No. 74L85, 4 bit magnitude comparators properly connected to compare the desired number of bits.

To further explain the timing control, the clock 112 may be the master clock to provide the overall sequencing including the control of the timing unit 116 which may be of any conventional arrangement such as a circuit including a plurality of dividing circuits as are well known in the art. An integrator output shift clock unit 190 which is a divide by 8 circuit responds to the clock 112 to apply pulses to an AND gate 192 also receiving an integrator read command from the timing unit 116 to apply a clock signal SR through an OR gate 194 to the integrator 90 for reading out the video data both during formation of the histogram and during formation of the truncation video. An input sample clock 198 synchronized by the clock signal C may apply a clock signal to the A/D converter 86 as well as to an AND gate 199 which in coincidence with a load command applies an SR signal both to the integrator 90 and to a read-write control unit 206 of the memory 30 for developing suitable internal timing to provide the read-write operation. The integrator read command and the integrator load command signals may be provided by the timing unit 116 which synchronizes the radar operation.

Figure 7:
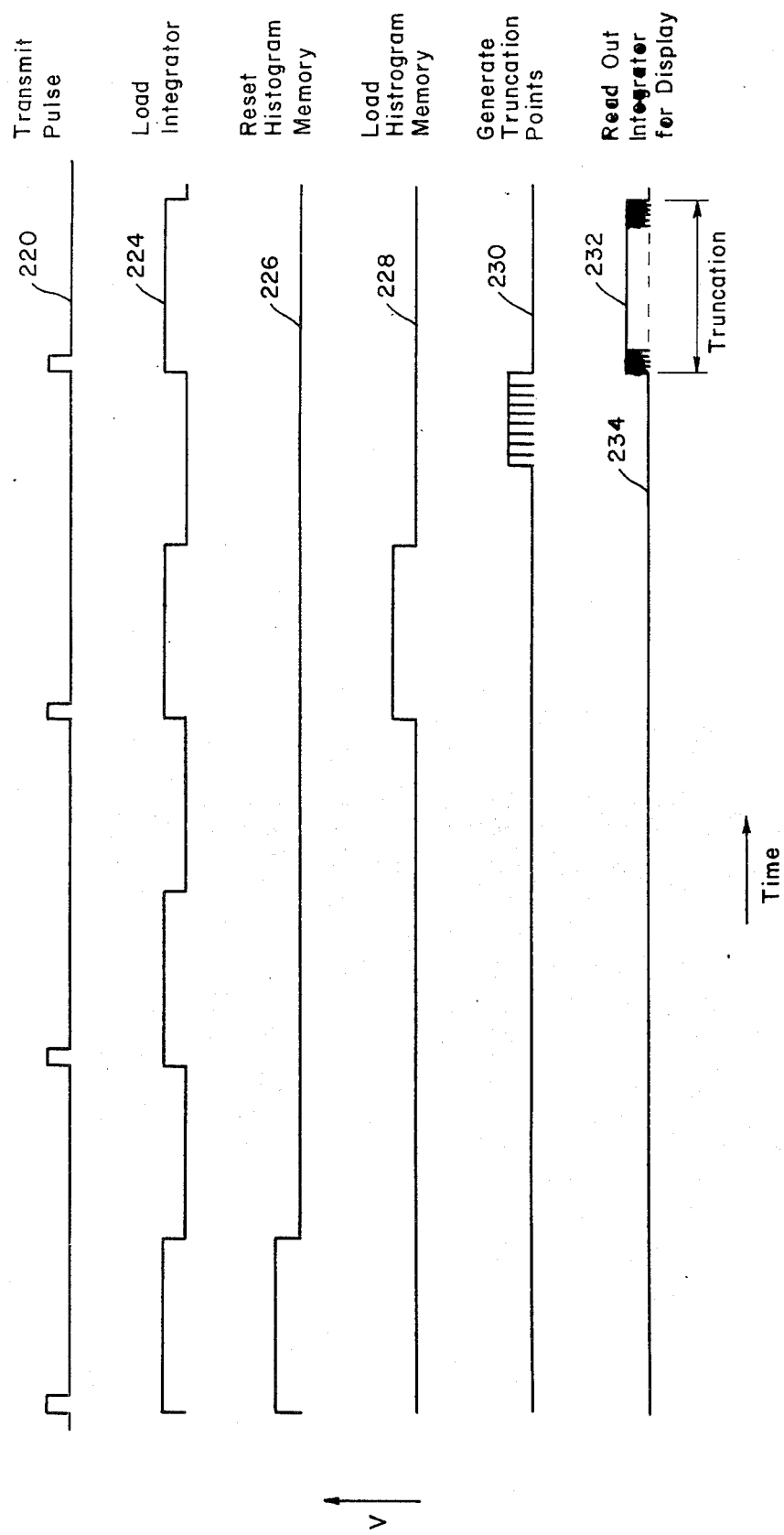
FIG. 7 is a schematic diagram showing waveforms of voltage as a function of time for further explaining the histogram equalization system of FIGS. 5 and 6.

Referring now to FIG. 7 as well as to FIG. 6 the pulses of a waveform 220 are the transmit pulses in an active system such as a radar or laser system or may be considered the master timing pulse in a passive system such as an infrared system. The pulses of a waveform 224 show that the integrator 90 is loaded with 512 signals in response to each of the pulses of the waveform 220. In the illustrated arrangement, the contents of the histogram memory derived from ten integrator loadings may be reset at any convenient time such as indicated by the timing pulse of waveform 226 during which time the contents of the memory 30 are reset to 0, as a reset pulse is applied to the reset gate 103 from the timing unit 116. The histogram memory is loaded to form the histogram in response to a timing pulse as shown by a waveform 228 during which period the contents of the integrator 90 are read out to address the memory 102 for each of the 512 words stored in the integrator 90. Once the histogram is formed in the memory 30, the truncation points are generated as shown by the pulse of a waveform 230 applied from the timing unit 116 to the accumulator 42, the counter 38, the gate 28 and the counter 118 to form 8 different truncation points which are then stored in the latch registers 50. The counter 118 responds to each comparison to be incremented for each truncation point. The next step is to read-out the integrator in response to the timing pulse of a waveform 234 during which time the truncated video is formed and applied through the composite lead 64 to the display unit.

Thus there has been provided an improved histogram equalization system for truncating video whereby the resulting display possesses an equal number of picture elements at all intensity values. In a radar or infrared application in accordance with invention, the concept of the invention forms this histogram equalization function at the point where the integrator video is truncated for loading into a main memory or into the display. While the integrator is read out, the actual video value is used to address a random access memory which is originally loaded with all zeros. The memory is organized such that there are as many addressable words as there are possible video intensity values carried in the integrator. Upon each addressing cycle, a value of one is added to the stored word thereby building up the histogram within the memory. Also the number of picture elements provided during a complete integrator cycle which may be either predetermined or accumulated to a total sum T is divided by the number of values to which it is desired to truncate. This value T/N which may be a constant for any system is then stored in a register for providing a comparison and represents the total number of picture elements to be counted at each intensity level so as to store the corresponding intensity level. The final step is to then read out the histogram memory is sequential order from an address equivalent to the lowest intensity value to the highest. The stored number of occurrences for each input video intensity level from the histogram are accumulated until the sum equals T/N and at this point the accumulator is reset and the histogram address is stored in a latch. Other suitable arrangements may be utilized in accordance with the invention such as having the accumulator continue its accumulation with the comparison constant increasing by T/N for detecting each new truncation point. When the memory is completely read out to form the last latch point or truncation point, these truncation points are then utilized in a truncator logic unit to reduce the number of bits in the integrator to the number to be used in the display or in the main memory. It should be noted that in accordance with the principles of the invention it is not necessary to form the truncation points on every accumulation cycle of the integrator such as 10 loadings and if the histogram memory is loaded in one accumulation cycle, the resulting histogram may be utilized for a selected plurality of accumulation cycles to form the new truncation points while providing an acceptable display having desirable detail and contrast enhancement.

What is claimed is:

1. A system responsive to a signal source of amplitude data of a first number of bits to develop a truncated signal having a second and lesser number of bits comprising:
   a histogram memory addressable with the value of said amplitude data for storing at each address the number of address occurrences during a first period,
   read address generator means coupled to said histogram memory for applying sequential addresses thereto during a second period,
   accumulating means coupled to said histogram memory for accumulating the number of occurrences read from said memory, during said second period,
   comparator means coupled to said accumulator means for responding when the accumulated occurrences equals a predetermined value equal to a selected fraction of the signals addressing said memory during said first period,
   truncation point latch means coupled to said comparator and to said read address generator for storing the truncation points; and
   truncation logic means coupled to said signal source and to said truncation point latch means for developing truncated signals of said second number of bits.

2. The combination of claim 1 in which said comparator means includes storage means to provide said predetermined value equal to the number of picture elements in a selected portion of an image, with said selected portion represented by the plurality of data signals utilized in the histogram memory for the formation of an image histogram.

3. The combination of claim 2 in which said truncation point latch means includes a plurality of registers equal to the number of intensity levels of said truncated signal.

4. The combination of claim 3 in which said truncation point latch means includes gating means coupled to the output of each register, and sequencing means coupled to said registers for sequentially gating the stored truncation points therefrom, and in which said truncation logic means includes a comparator coupled to said signal source and to the gating means at the output of each register and includes a counter coupled to said comparator and counting in sequence with said sequencing means for providing said truncated signals.

5. The combination of claim 4 in which each of said registers includes an input gate and said read address generator means is coupled to the input gates of said registers and further including an address counter coupled to the input gates of said registers for sequentially addressing a different register for each truncation point defined by said comparator means.

6. A histogram equalization system responsive to a source of video amplitude signals received during a range period to form truncated video signals comprising:
   integrator means for sequentially storing the video signals received during a plurality of range periods,
   a histogram memory coupled to said integrator means for forming a histogram,
   accumulator means coupled to said histogram memory for accumulating the contents of said histogram memory for defining truncation intensity levels,
   storage means coupled to said accumulator means for storing said truncation intensity levels; and
   truncation logic means coupled to said integrator means and to said storage means for comparing the video amplitude of each signal with the truncation intensity levels to form truncated video signals representative of the video signals received during said plurality of range periods.

7. The combination of claim 6 in which said accumulator means includes read addressing means coupled to said histogram memory for sequentially reading out the contents thereof so as to accumulate the frequency of occurrences of said histogram.

8. The combination of claim 7 in which the video amplitude signals received from said integrator each have a first number of bits and the truncated video signals each have a second and lesser number of bits, and the video amplitude signals each represent a picture element, for display, said accumulator means further including comparator means coupled to said storage means, and a source of a signals representative of the number of picture elements at each truncation point coupled to said comparator means.

9. The combination of claim 8 in which said truncation logic means includes a comparator coupled to said integrator and to said storage means, and counter means coupled to said comparator and to said storage means to form said truncated video signals.

10. A histogram equalization system comprising:
   a source of digital signals representing amplitude,
   memory means coupled to said source for being addressed by the amplitude value of said digital signals,
   means to add a one to the contents of each addressed cell of said memory means,
   accumulator means coupled to said memory for storing the contents of said cell when read therefrom,
   comparator means coupled to said accumulator means for developing truncation point signals,
   truncation point storage means coupled to said accumulator means for storing said truncation point signals, and
   logic means coupled to said truncation point storage means and to said source for developing truncated digital signals.

* * * * *